May 2, 1933. J. A. LENTZ 1,906,797
DENTAL ARTICULATOR
Filed Jan. 23, 1928    4 Sheets-Sheet 4
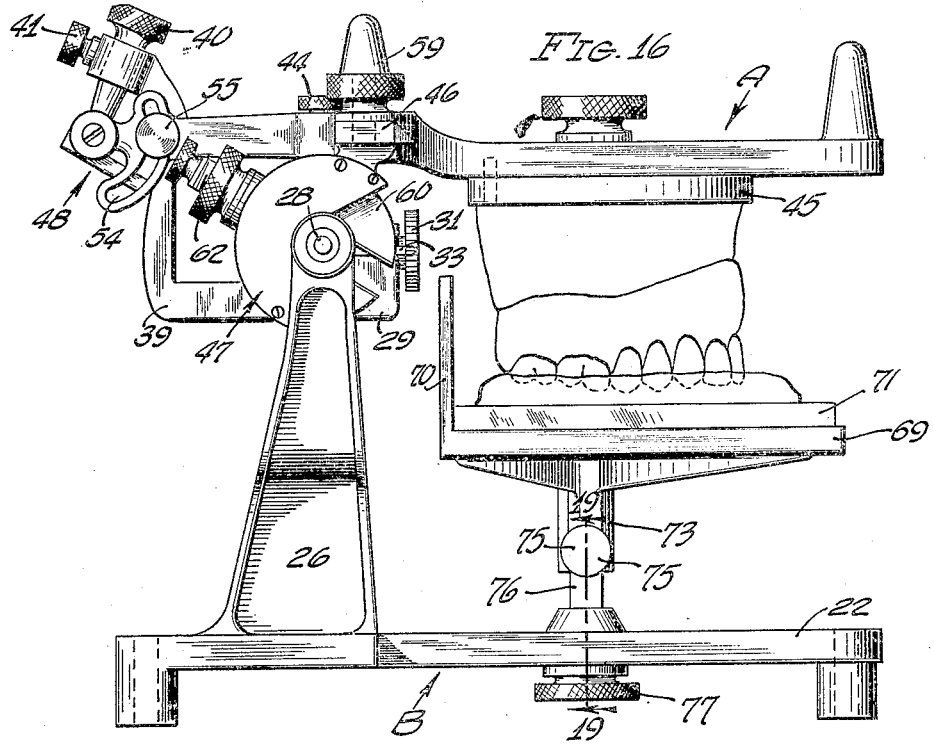
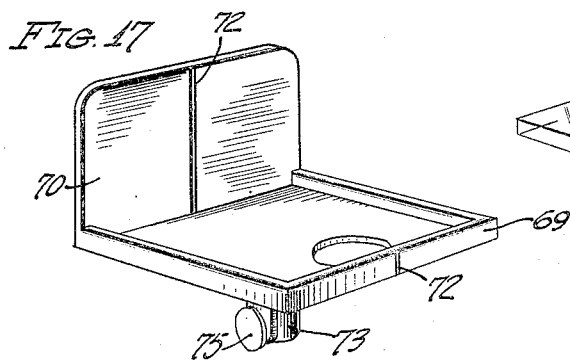
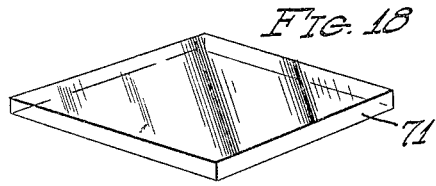
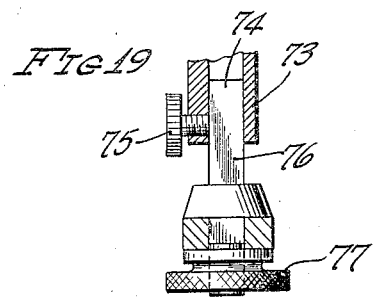
INVENTOR
JOHN A. LENTZ
BY Munn & Co.
ATTORNEY Patented May 2, 1933

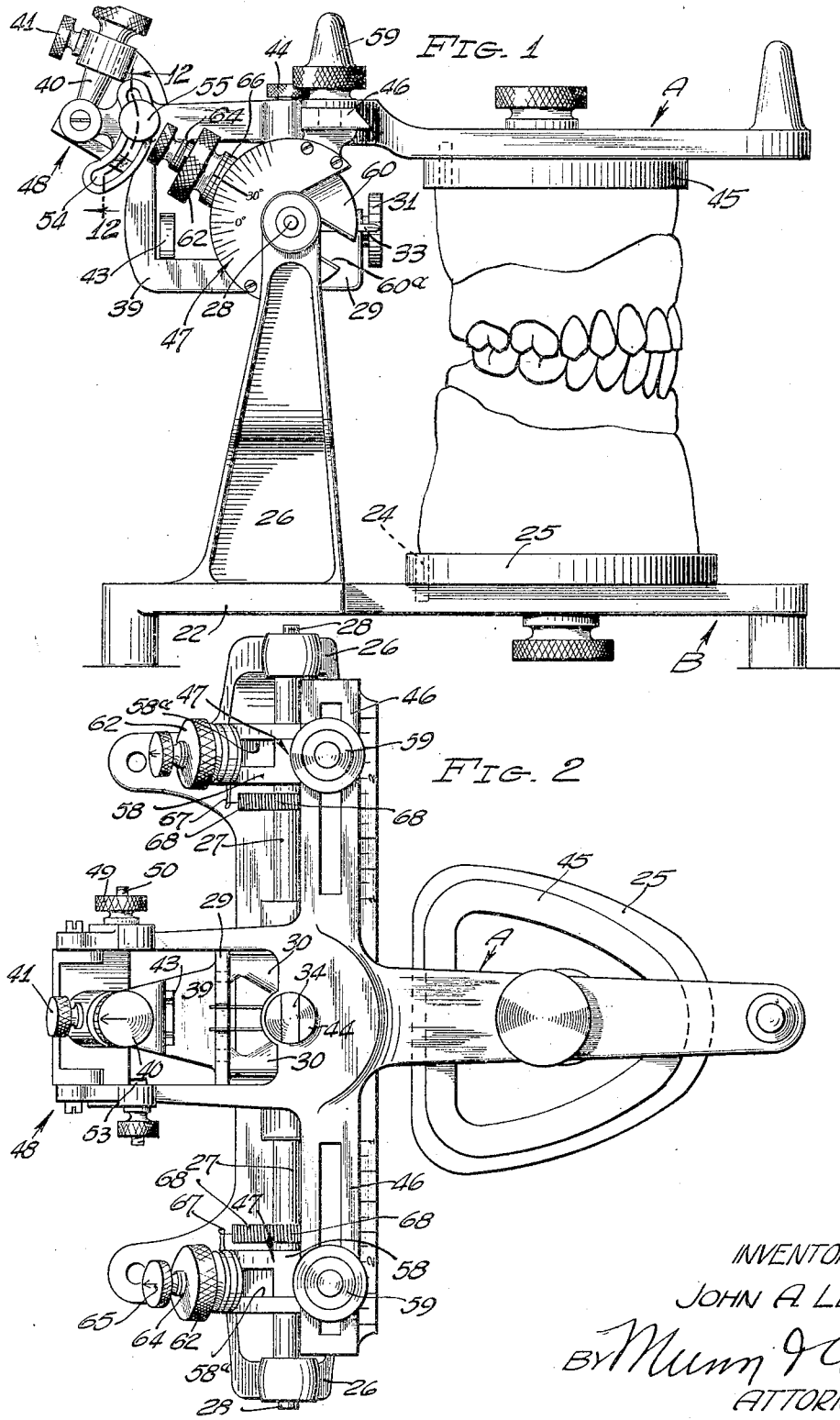

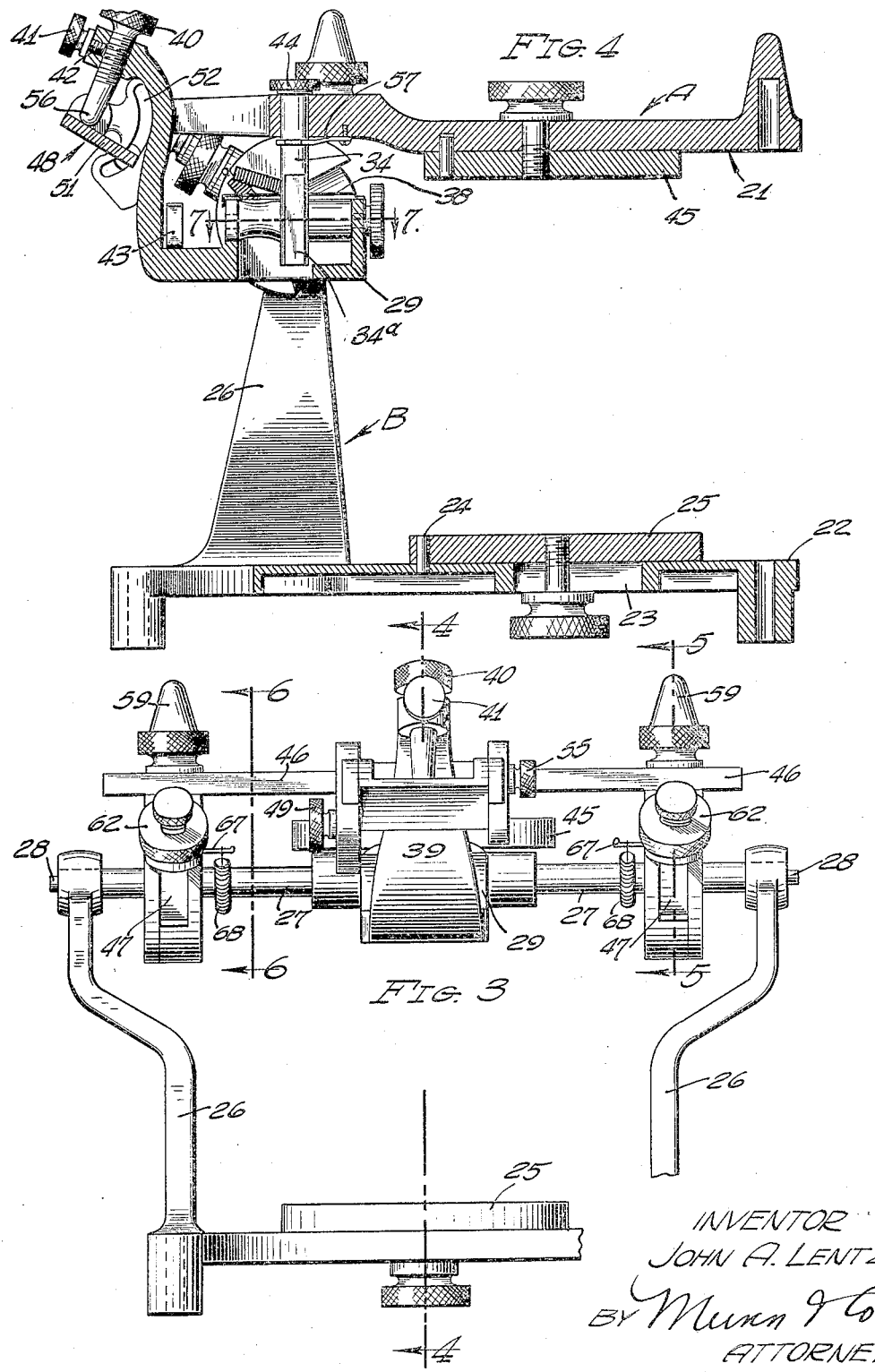

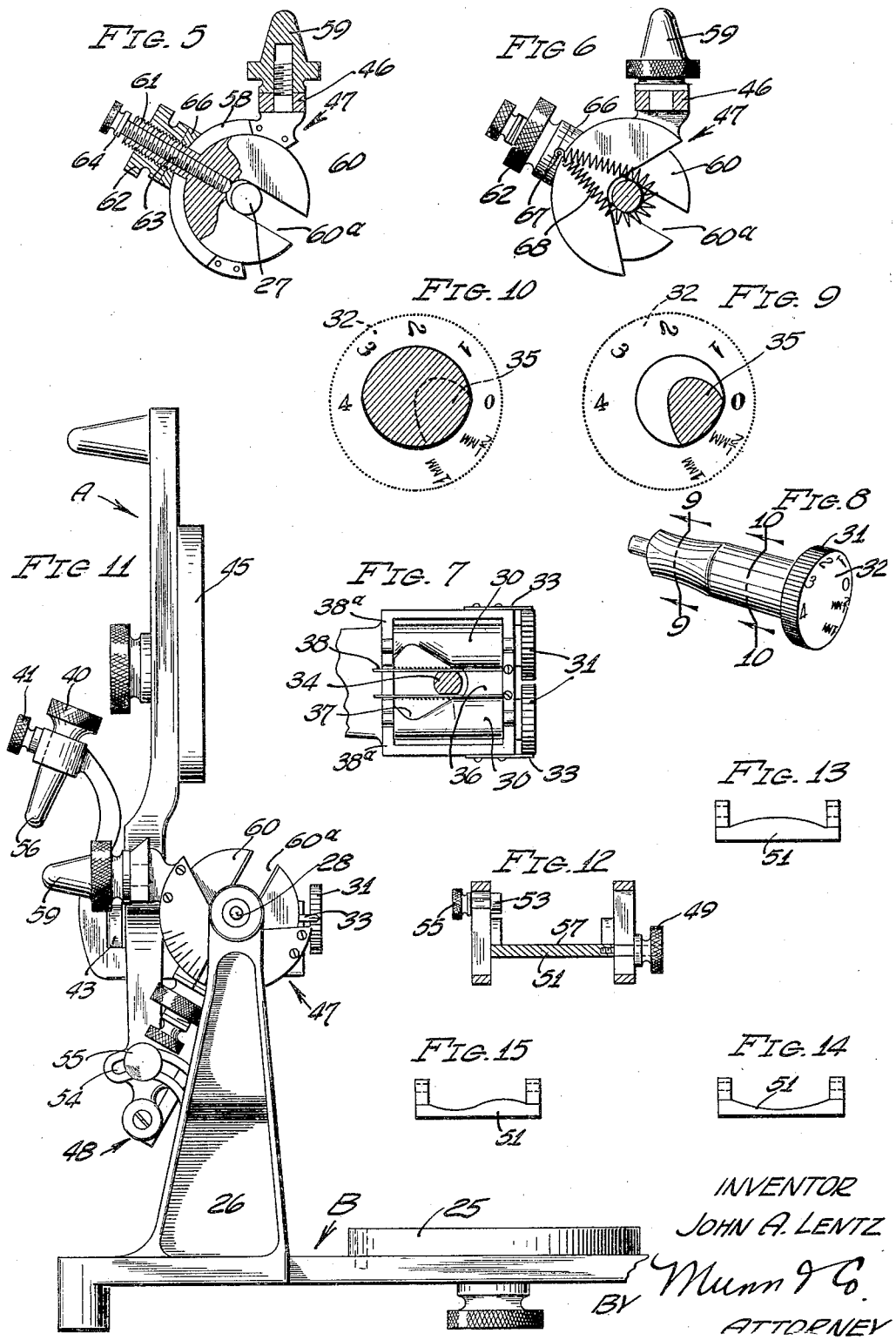

1,906,797

UNITED STATES PATENT OFFICE

JOHN A. LENTZ, OF PHOENIX, ARIZONA

DENTAL ARTICULATOR

Application filed January 23, 1928. Serial No. 248,805.

The present invention relates to improvements in dental articulators, particularly to that class known as anatomical articulators. To make more clear the construction and operation of the articulator, it will be well to set forth a few general principles underlying articulators in general, and the one forming the subject-matter of the present application in particular. To avoid confusion, let it be understood that the terms right and left as herein used correspond to the right and left side of the head.

Dental articulators are used in arranging and articulating artificial teeth, and their object is to provide means for disposing the upper jaw, or maxillæ, and lower jaw, or mandible, in such a manner that they may be held and moved relatively to one another in a manner resembling natural positions and movements of the jaws of the person for whom the artificial dentures are intended.

The position of maxillæ and mandible being relative, either may be regarded as stationary and all mandibular movements referred to the other. In the human subject it is natural to consider the maxillæ as fixed. In most articulators, including the one forming the subject-matter of this application, it has been found convenient to have and consider the mandibular portion fixed, and to reproduce the movements as movements of the maxillary frame relative to the mandibular frame.

The major mandibular movements may be reduced to four elementary movements, or excursions of the mandible from and back to a normal or centric position. These are: First, the opening movement, and return or closing movement; second, the right lateral movement and return; third, the left lateral movement and return; and fourth, the incisive, or protrusive movement and return. Since the return movements are simply reverse movements, we may consider them simply as negative movements and included by the terms opening, right lateral, left lateral, and incisive or protrusive.

The opening movement occurs on a substantially horizontal axis in the region of the condyles. In the right lateral movement, in the horizontal plane, there is a rotation around a center in the neighborhood of the right condyle varying from about one and one-fourth inches from the median line to perhaps two and one-half inches, depending upon the size and shape of the mandible and other modifying factors. In the vertical plane the movement is influenced by the condyle paths at the rear, and farther forward by the relations of the teeth. It is, of course, apparent that if two points are guided horizontally to produce the rotation in the horizontal plane, and three points are guided vertically, this movement can be reproduced. In most articulators two points corresponding to the condyles, and one arbitrary point in front, known as the incisal point and placed as near as convenient to the tips of the lower central incisors are used. However, it is apparent that any three points guided relatively to the three points already mentioned will produce the same result.

In the present articulator, while two points in the opening axis in the region of the condyles are used for the rear points, the third point, or incisal point, instead of being placed in front of the teeth, is placed in the median line about two inches back of the opening axis, thus avoiding the obstruction to vision and manipulation incident to a point placed in front of the teeth.

The left material movement is, of course, similar to the right lateral movement though the two movements are not necessarily symmetrical.

The incisive movement is a substantially forward movement in the horizontal plane, while vertically it is influenced by the two condyle paths at the rear and incisal or tooth guidance in front.

In additional to the major movements described, there is recognized the existence of a more or less transverse side-to-side movement, and also, under certain conditions, a short retrusive movement of the mandible, that is, a movement rearward from centric position.

The objects of the invention are:

1. Speaking generally to permit reproduction of the mandibular movements described in a more practical manner than heretofore;

2. More particularly in distinction from other articulators to permit condylar guidance both above and below horizontal, and to provide for incisal guidance in lateral movements both above and below a transverse plane passing through the path of the incisal point in incisive movement;

3. To provide for transverse and rearward mandibular movements to a predetermined extent;

4. To provide simpler means than heretofore used for moving the rotating centers of lateral movement, laterally and also antero-posteriorly;

5. To provide simpler means than heretofore used for producing the horizontal component in lateral movements;

6. To eliminate the necessity of using a face bow by providing other means of orienting the models in the articulator;

7. To provide more practical means for returning the constructed dentures to the articulator for the purpose of milling, in the same position as originally set up in the articulator;

8. To move the incisal guidance to a position back of the teeth to avoid obstruction to vision and manipulation;

9. To provide means for opening or closing the bite without disturbing the relation of the condyle and incisal guides to the maxillary frame;

10. To apply most effectively the pressure for the return of condyle rods to centric position; and 11. To facilitate the disengagement of the upper from the lower frame.

I will describe only one form of dental articulator embodying my invention and will then point out the novel features in claims.

In the accompanying drawings:

Fig. 1 is a view showing in side elevation one form of dental articulator embodying my invention;

Fig. 2 is a top plan view of the articulator shown in Fig. 1;

Fig. 3 is a view showing the articulator in rear elevation;

Figs. 4, 5, and 6 are vertical sectional views taken on the lines 4—4, 5—5, and 6—6, respectively, of Fig. 3;

Fig. 7 is a horizontal sectional view taken on the line 7—7 of Fig. 4;

Fig. 8 is an enlarged detail perspective view of one of the cams as shown in Fig. 7;

Figs. 9 and 10 are sectional views taken on the lines 9—9 and 10—10 of Fig. 8;

Fig. 11 is a view showing the articulator in side elevation and in open position;

Fig. 12 is a sectional view taken on the line 12—12 of Fig. 1;

Figs. 13, 14, and 15 are detail views showing in end elevation different forms of guide members adapted for use in the articulator;

Fig. 16 is a view showing the articulator in side elevation and with the templet applied thereto;

Fig. 17 is a detail perspective view of the templet shown in Fig. 16;

Fig. 18 is a detail perspective view of the slab shown in Fig. 16; and

Fig. 19 is a vertical sectional view taken on the line 19—19 of Fig. 16.

The articulator consists essentially of a lower or mandibular frame B and an upper or maxillary frame A, to one or the other of which all operative mechanisms are attached. In operation, each of these frames moves as a unit relative to the other.

The mandibular frame B has a three-legged base 22 affording attachment by means of a slot 23 and a peg 24 to the lower model frame 25 to which the lower model is attached by means of plaster of Paris. Two standards 26 rising from the rear of the mandibular frame support the condyle rods 27, which constitute the opening axis of the instrument. Laterally the condyle rods terminate in two properly shaped studs 28 for attachment of a face bow where it is desired to use a face bow.

At the medial extremity, each of the condyle rods are joined to a rectangular housing 29 in which two cams 30 are journaled, as shown in Fig. 7. Each cam terminates in front in a thumb nut 31, the face of which constitutes a dial 32 numbered and lettered as shown in Figs. 8, 9, and 10, and indicates respective positions of the cams for various purposes. Each cam 30 is held in desired position rotationally by a spring catch 33.

Each cam consists of a cylindrical rod cut away in certain regions to adapt it to the purpose to be accomplished, and in normal centric position each cam contacts a central rod 34 situated between the two cams and depending from the maxillary frame A, as best illustrated in Fig. 4. The points of contact lie substantially in the opening axis. The two cams are similar in form but one is a right and the other a left so that they must be rotated in opposite directions to bring successively similar operative surfaces against the contacting rod 34 as indicated by the dials. Referring to the left cam shown in Fig. 8 from the front to the opening axis, that is, to the point of contact with the rod 34, in cross-section with the cam set at 0, the lower half of the cam 0 to 4 is a true semicircle, the upper half at the point marked 1MM has a radius to the longitudinal axis of the cam, one millimeter less than the radius of the lower half to the same axis. At the point marked ½MM the radius is one-half millimeter less than the radius of the lower half of the cam. The curve from 0 through ½MM and 1MM to 4 is simply a gradual connecting curve. From the point of contact with the rod 34 back, the circumference from 0 through ½MM to 1MM remains the same. From 0 through 1, 2, 3, 4, up to 1MM the surface slopes inward until at a point approximately one-half inch back of the opening axis a cross-section of the cam would appear as in Figs. 9 and 10 at 35. From this point rearward there is a gradual slope back to the original form of circumference.

From this arrangement it is evident that when the respective numbers on the dials are brought to face the central rod 34; at 0 a parallel slot 36 is provided, the sides of which contact the central rod, limiting its travel to a forward and back movement, at ½MM and 1MM a similar slot with one-half millimeter and one millimeter, respectively, of lateral play is provided, intermediate effects being secured at intermediate points. This enables direct transverse movement or the imposition of a transverse component on to the forward and back movement provided by the ordinary slot. At position 1 on the dial from the contact of the central rod 34 back, a gradually widening slot 37 is produced, the effect of which is that, when lateral movement is executed, the center of rotation is thrown rearward. At 2, 3, and 4 the effect is successively increased. Intermediate points, of course, would give intermediate effects.

A spring 38 pressing on each side of the rod 34 is attached to the housing as shown at Fig. 4 and is intended to keep the central pin in the sagittal plane when contact with the slot is lost and the upper frame released from manual control. It may be thrown out of action by hooking the free ends of the spring over studs 38ª.

From the rear of the rectangular housing 29 emerges a swanneck 39, through the upper extremity of which an adjustable pin 40, hereinafter referred to as the incisal pin, is mounted. On the upper surface of the knurled end of the incisal pin an arrow, shown in Fig. 2, indicates the position of the pin rotatively. The incisal pin is securely held in normal position by the thumb screw 41 projecting into a hole 42, which extends partly into the incisal pin.

A clip 43 on the swanneck 39 grasps a knurled head 44 of the rod 34 when the maxillary frame is turned back, holding the upper frame upright.

The maxillary frame A has attached in front, the upper model frame 45 in the same manner as the lower model frame 25 is attached to the mandibular frame. Two laterally extending slotted arms 46 on the maxillary frame afford attachment for the condyle head which is indicated in general by the numeral 47 and will be described in detail later.

In the rear of the maxillary frame is attached the incisal guide 48, which is adapted to be held at any required angle by a thumb nut 49, the latter being screwed on a threaded stud 50 on a guide member 51, and the stud projecting through an arcuate slot 52 in the side of the frame. The position to which the guide member is set is marked by a block 53, which is slidable in another arcuate slot 54 formed in the side of the frame opposite to the side having the slot 52 therein, and the block is locked in the marking position by a set-screw 55.

The incisal guide member is mounted on a transverse axis, co-axial with the center of the semi-spherical end 56 of the incisal pin 40, and it may have a flat surface for contacting with the semi-spherical end, as shown at 57 in Fig. 12, or a convex contacting surface as shown in Fig. 13, or a concave surface as shown in Fig. 14, or up on one side and down on the other as shown in Fig. 15. Substantially in the median line and between the condyle heads the rod 34 is rotatable in the maxillary frame A. The rod is flattened at opposite points, as indicated at 34ª, and in the region where it contacts with the cams 30, while above the flattened portions the rod is formed with a groove in which a spring 57 engages to maintain the rod in the lowered position shown in Fig. 4 and yet permit free rotation of the rod by turning of the head 44. The surface of the head 44 is marked as shown in Fig. 2 to indicate its position rotationally. By turning the head, any desired space may be developed between the rod 34 and the cams 30 so as to permit transverse movements or add a transverse component to movements otherwise provided.

Each condyle head 47 consists of a housing 58 slidably mounted on the slotted arm 46.

A disk 60 is provided with a slot 60ª to receive the corresponding condyle rod 27 and to allow the rod to pass $\frac{1}{16}$ of an inch beyond the center of the disk, has a threaded projecting stud 61 opposite the slot which passes through a circumferential slot 58ª in the housing 58, and is adjustably fastenable to the housing within an angular range of 100° by a nut 62. Through the stud 61 and the disk 60 and normally engaging the condyle rod 27 and holding it at the center of the disk is a screw 63 with a rounded end touching the rod 27. A shoulder 64 on the screw 63 normally abuts the end of stud 61 and exposed end of the thumb head has a mark 65 showing its position rotationally.

By unscrewing the screw 63, the condyle rod is allowed to slip backward.

Between nut 62 and housing 58 a washer 66 adapted to ride the circumference of the housing is interposed. It has an inwardly projecting hook 67 to which a spring 68 is fastened. The spring entirely surrounds the condyle rod 27 and holds the rod against the rounded head of screw 63. As the hook moves rotationally with the disk it is obvious the spring 68 at all times pulls parallel with the path of the condyle rod and is therefore most effective. When these springs are unhooked the maxillary frame may easily be disengaged from the mandibular frame.

For orienting the models in the articulator I provide a templet which, as shown in Figs. 16 to 19, consists of a frame 69 with an upwardly extending rear wall 70. On the frame rests a slab of glass or porcelain 71. A well defined line 72 is formed along the median line of the templet to assist in orientation of the upper model. To the bottom of the frame 69 is attached an extension 73 which by means of rectangular hole 74 and thumb nut 75 is vertically adjustable on the rectangular shaped standard 76. The latter is fastened into the antero-posteriorly elongated slot 23 by a thumb nut 77 fitting the threaded lower extremity of the standard 76, and therefore adjustable antero-posteriorly. As illustrated, scales are provided to indicate the inclination of the condyle guides and the incisal guide, the lateral distance of condyle heads, and also the vertical and antero-postero position of the templet.

In operation models of the jaws are made, base plates and wax bite rims are built up out of suitable material and a bite of wax or other suitable material, is taken in centric occlusion. A bite of plaster of Paris is taken on top of this showing the incisive or protrusive relation. The incisive bite is removed and laid aside for future use. Likewise, if desired, lateral bites are taken. The two base plates with wax bite rims in place showing line of occlusion and marked to show the median line and with any other marks desired to assist in orientation, are removed from the mouth and separated if not already so. The templet is placed in position, and the surface of the slab made to conform to the contemplated height of the occlusal plane. The upper model is trimmed to a flat surface at the back as close to the tuberosities as permissible and perpendicular to the occlusal plane. The model with wax ring in place is supported as desired on the templet and pushed back against the rear wall of the templet, with the median line of model and of the templet in alignment. Plaster of Paris is now poured on top of the model and the upper model frame and allowed to set, thereby securing the model to the upper frame and permitting removal of the templet. The whole articulator is now inverted and the lower model frame attached, and, with the lower model supported by the centric bite on the upper model, plaster is poured over the lower model and frame securing it to the mandibular frame.

With the articulator returned to normal position, the condyle heads are moved to a position substantially in alignment with the ridges of the lower jaw or the lower teeth if in place and the cams set to register zero or to any other desired position. If instead it is desired to use lateral bites for setting the condyle heads and cams the condyle heads are moved to their innermost position, the cams 30 on the mandibular frame are set to 4 on the dial, giving the greatest angle of cam surface to the sagittal plane, the slotted disks in the condyle head are freed, the incisal guide dropped to its lowest position, and a lateral bite is introduced. The corresponding condyle head is moved outwardly till the rounded end of screw 63 in the condyle head touches the condyle rod 27 and the corresponding cam is turned till it engages the rod 34. The other lateral bite is of course manipulated in the same way for the other side. The slotted disks in the condyle head being still free, the flattened rod 34 being turned to a point allowing greatest lateral play, and the incisal guide still lowered to its lowest position, the incisal bite is introduced. The slotted disks are fastened in their new position and the incisal guide brought to contact with the incisal pin end 56 and secured, and its position marked by the nut 55. The bite is removed and the rod 34 returned to normal position. If an incisal guide adapted to special angular vertical adjustment for lateral movement is used, it may be adjusted to these movements at any time, either in accordance with lateral bites or other indications such as over-bite, cusp length, and peculiarities of condylar guidance.

With the articular adjusted as described, it is evident that the various movements may be reproduced. Any slight inaccuracies due to possible errors in rotation points are, in final milling of the dentures to avoid a locked condition of the dentures, automatically corrected.

After the teeth are set up ready for removal from the articulator, the lower model is first removed. The templet is again placed in position with the surface of the slab adjusted, leaving a space of about ¼ inch between it and the tip of the upper teeth, as shown in Fig. 16. A little soft plaster is placed on the plate and the upper teeth allowed to settle down into it, the articulator being in normal centric position. When the plaster has hardened the articulator is opened, the upper model removed and the denture completed, all but milling. The upper denture is now set into the plaster impression on the templet in its original position and plaster is flowed on the upper surface of the denture and the upper model frame securing the denture once more to the maxillary frame. The templet is removed and the lower denture mounted to fit the upper denture. They are then milled by introducing abrasive paste between the teeth and performing the major mandibular movements and following this by the desired extent of transverse and rearward movements, the transverse being secured by turning rod 34 on the maxillary frame or the cams on the mandibular frame or both, and the rearward by turning screw 63 in the condyle head. If desired, milling may be done also from lateral centers internal or external to the one to which the teeth are set by moving condyle heads inward or outward; and with the condyle heads in any of these positions, the centers may be thrown back by setting the cams on the mandibular frame to various angles as desired. In short, any desired components may be introduced singly or in combination.

If at any stage it is desired to open or close the bite to any extent, it is easily done by adjusting the incisal pin. By doing this, the relation of the condylar and incisal guidance to the maxillary frame will not have been disturbed as they are both attached to the maxillary frame. If it is desired to separate the upper and lower frames for convenience in working separately on the models, the coil springs are unhooked and the upper frame easily removed.

While I have described one particular form of instrument, it is of course understood that the invention includes variations within the scope of the following claims.

I claim:

1. In an articulator, relatively movable model supporting frames, and an incisal guide situated at the rear of the opening axis of the frames.

2. In an articulator, relatively movable model supporting frames, and an adjustable incisal guide situated at the rear of the opening axis of the frames.

3. In an articulator, relatively movable model supporting frames, and an incisal guide adjustable about a horizontal axis transverse of the sagittal plane of the frames and situated at the rear of the opening axis of the frames.

4. In an articulator, a mandibular frame, a maxillary frame having an incisal guide thereon, condyle guides on one of the frames, a member on the mandibular frame engaging a part of the maxillary frame, and means for adjusting said member to cause it to coact with the maxillary frame for effecting adjustment of the mandibular frame to open or close the bite and yet preserve the relation of the condyle and incisal guides with respect to the maxillary frame.

5. In an articulator, a pair of model supporting frames one of which is capable of transverse movement, one of the frames having a slot therein, and a member on the other frame projecting into said slot and thus coacting to control transverse movement of the said frame, said member being rotatable in its frame to increase or decrease the permissible transverse movement of the frame.

6. In an articulator, a pair of frames, relatively movable, and means for controlling the horizontal component of both right and left lateral and of transverse movements of the frames from center relation and permitting free vertical movement thereof comprising a pin and slot connection between the frames.

7. In an articulator, a pair of frames, relatively movable, and means for controlling the horizontal component of both right and left lateral and of transverse movements of the frames from center relation comprising a pin and slot connection between the frames permitting free vertical movement and adjustable to vary the permissible transverse movement between the slot and the pin.

8. In an articulator, relatively movable frames, and means for producing in the frames the vertical component of mandibular movements by guiding a plurality of points vertically, one of the vertically guided points situated at the rear of the opening axis of the frames.

9. In an articulator, relatively movable frames, and means for producing both right and left lateral movements from center relation comprising four elements one of which is guided vertically, another horizontally, and the remaining two both vertically, and one or the other horizontally according to the respective lateral movement.

10. In an articulator as embodied in claim 9 wherein all of the elements are disposed at the rear of models when in the frames.

11. In an articulator, a pair of frames, an incisal guide situated at the rear of the opening axis of the frames, a right and left guided element substantially in anteroposterior alignment with the respective lateral center of rotation, one of the frames having a slot, and a centrally located element on the other frame engaging within the slot.

12. In an articulator, a pair of frames, an incisal guide positioned at the rear of models when in the frames, a right and left guided element substantially in anteroposterior alignment with the respective lateral center of rotation, one of the frames having a slot, and a rotatable element on the other frame engaging within the slot and of such form that when rotated the space between the element and the slot is varied.

13. In an articulator, relatively movable model supporting frames, condyle guides having one part on one frame and another part on the other frame having points of operative engagement with the first part, means correlated to said parts by which the position in the horizontal plane of the points of operative engagement between said parts can be adjusted to make said points substantially coincident with the axis of lateral movement around the respective condyle of the jaw, and an incisal guide at the rear of the models when in the frames.

14. In an articulator, relatively movable model supporting frames, condyle guides having one part on one frame and another part on the other frame having points of operative engagement with the first part, means correlated to said parts by which the position in the horizontal plane of the points of operative engagement between said parts can be adjusted to make said points substantially coincident with the axis of lateral movement around the respective condyle of the jaw, and an adjustable incisal guide at the rear of the models when in the frames.

15. In an articulator, relatively movable model supporting frames, condyle guides having one part on one frame and another part on the other frame having points of operative engagement with the first part, means correlated to said parts by which the position in the horizontal plane of the points of operative engagement between said parts can be adjusted to make said points substantially coincident with the axis of lateral movement around the respective condyle of the jaw, and an incisal guide adjustable about a horizontal axis transverse of the sagittal plane of the frames and situated at the rear of the models when in the frames.

16. In an articulator, relatively movable mandibular and maxillary model supporting frames, condyle guides mounted on the maxillary frame, elements on the mandibular frame engaged by and coacting with the condyle guides, and means on one of the frames correlated to the point of engagement between the condyle guides and said elements for changing the position of the point of engagement in a horizontal plane to make said point substantially coincident with the axis of lateral movement around the respective condyle of the jaw.

17. In an articulator, maxillary and mandibular frames relatively movable, condyle heads adjustable on the maxillary frame to occupy different positions in a horizontal plane, and a pin and slot connection between the frames and situated between the condyle heads for controlling transverse movements of the frames.

18. In an articulator, a mandibular and a maxillary frame relatively movable, connections between the frames permitting the production of mandibular movements, a plurality of guided elements each element being attached to one of the frames, guiding means on the other frame coacting with the elements so that two of the elements are guided horizontally and three of the elements are guided vertically, one of the vertically guided elements being back of the opening axis of the frames.

19. In an articulator relatively movable model supporting frames, a pair of laterally disposed condyle heads adjustable to various positions in the horizontal plane, each head being mounted on one frame, elements each on one frame engaged by a head on the other frame and by coaction of heads and elements controlling the relative movement of the frames, one of the frames having a central slot situated between the heads, and a coacting element on the other frame working with the slot and controlling the permissible relative transverse movement of the frames.

20. In an articulator relatively movable model supporting frames, a pair of laterally disposed condyle heads, each head being mounted on one frame, elements each on one frame engaged by a head on the other frame and by coaction of heads and elements controlling the relative movement of the frames, one of the frames having a central slot situated between the heads, and a coacting element on the other frame working within the slot and controlling the permissible relative transverse movement of the frames, and an incisal guide situated back of the opening axis of the frames.

21. In an articulator, a pair of model supporting frames relatively movable, means for producing both right and left lateral movements of one of the frames, comprising right and left condyle guides each mounted on one of the frames, guided elements on the other frame each engaged by one of the condyle guides, means whereby the position in the horizontal plane of the operative points of engagement between the condyle guides and guided elements may be adjusted to make said points substantially coincident with the axis of lateral movement around the condyles, a third guided element between the first elements, and a third guiding means for the third guided element.

22. In an articulator a mandibular and maxillary frame, relatively movable, an element on one frame, a slot on the other frame in which said element is received for controlling the relative transverse movement of the frames, said element and coacting slot being situated substantially at the intersection of the opening axis and sagittal plane of the frames, condyle guides adjustable on a horizontal axis, each guide being mounted on one of the frames, guided elements each on one of the frames engaged by a condyle guide, and means whereby the position in the horizontal plane of the operative point of engagement between the condyle guide and the guided element may be changed to make it substantially coincident with the axis of lateral movement around the respective condyle.

23. In an articulator, relatively movable model supporting frames, means for producing the horizontal component of both right and left lateral movements comprising three elements in substantially lateral alignment, the middle element being mounted on one frame and engaging on the other frame in a manner to control the transverse movement of the frames relatively in both lateral movements, each of the right and left laterally situated elements being mounted on one frame, coacting means on the other frame engaging the last mentioned elements for limiting relative movement in the horizontal plane of the frames and means whereby the position in the horizontal plane of the point of engagement between each of the laterally situated elements and the respective engaging means on the other frame may be adjusted to correspond substantially to the axis of horizontal movement around the respective condyle.

24. In an articulator mandibular and maxillary frames relatively movable, a pair of cams on one frame, the two cams forming a slot, and an element on the other frame coacting with the cams to permit longitudinal and vertical movement of the element, each cam being rotatably adjustable on a longitudinal axis and of such form that by rotation of the cam the permissible transverse movement of the coacting element is controlled.

25. In an articulator, a pair of frames, an incisal guide positioned at the rear of models when in the frames, one of the frames having a centrally located element, and members on the other frame defining a slot in which the element is received, said members being adjustable to vary the form and size of the slot to control movements of the element therein.

26. In an articulator, a pair of frames, an incisal guide positioned at the rear of models when in the frames, one of the frames having a slot and the other a pin received in the slot, the slot and pin being arranged one to the other to permit vertical and horizontal movements of the pin in the slot.

27. In an articulator, relatively movable frames yieldably mounted, a plurality of elements, each connected to at least one of the frames, and guiding means on the other frame engaging the elements so that in the production of mandibular movements two of the elements are guided horizontally and three of the elements vertically, one of the vertically guided elements being situated at the rear of the opening axis of the frames.

28. In an articulator, relatively movable frames, means for producing both right and left lateral movements comprising four elements, means for guiding one element solely vertically in both lateral movements, means for guiding another element solely horizontally in both lateral movements, and means for guiding the remaining two elements vertically in both lateral movements and at least one horizontally according to the respective movement.

29. In an articulator as embodied in claim 28 wherein the last two elements are disposed laterally from the sagittal plane and the right element being horizontally guided in right lateral movement and the left element in left lateral movement.

30. In an articulator as embodied in claim 28 wherein the last means have parts on one frame horizontally disposed and other parts on the other frame adjustable about the first parts as an axis.

31. In an articulator, two frames relatively movable, a pair of cams on one frame and provided with a plurality of operative surfaces, said cams being spaced so that those surfaces confronting each other form a slot, a member on the other frame disposed within the slot to be engaged by the confronting surfaces of the cams, means for mounting the cams on a horizontal axis to bring different operative surfaces thereof into confronting relation whereby the form of the slot is varied.

32. In an articulator, relatively movable model supporting frames, condyle members mounted on one of the frames to define the inter-condylar axis, a templet on one of the frames for supporting a model thereon, and an upstanding part at the rear portion of the templet forming an abutment against which the back of the model may be abutted to define its antero-posterior position with respect to the inter-condylar axis.

33. In an articulator, relatively movable model supporting frames, condyle members mounted on one of the frames to define the inter-condylar axis, a templet on one of the frames for supporting a model thereon, an upstanding part at the rear portion of the templet forming an abutment against which the back of the model may be abutted to define its antero-posterior position with respect to the inter-condylar axis, and means on the frames for adjusting the condyle members to occupy various positions in the horizontal plane with respect to one of the models.

34. In an articulator, a maxillary frame and a mandibular frame, said frames being relatively movable, a guided member on the mandibular frame, two vertical guides on the maxillary frame each engaging the guided member on the mandibular frame, a third vertical guide on the maxillary frame, a pin on the mandibular frame engaging the third vertical guide, and means for adjusting the effective length of the pin to open or close the bite.

35. In an articulator as embodied in claim 34 wherein all three vertical guides are adjustably mounted on horizontal axes.

36. In an articulator, maxillary and mandibular frames relatively movable, and condylar guidance and incisal guidance both on the maxillary frame, the incisal guidance being back of the position of the teeth when in the frames.

37. In an articulator, maxillary and mandibular frames relatively movable, and condylar guidance and incisal guidance both on the maxillary frame, the incisal guidance being back of the opening axis of the frames.

38. In an articulator, maxillary and mandibular frames relatively movable, condyle guides, means for mounting the guides on the maxillary frame so that they may be moved to different positions in a horizontal plane, and a pin and slot connection between the frames and situated between the condyle guides for controlling transverse movements of the frames.

39. In an articulator, maxillary and mandibular frames relatively movable, condyle guides on the maxillary frame, and a pin and slot connection between the frames and situated between the condyle guides for controlling relative transverse movements of the frames.

40. In an articulator, maxillary and mandibular frames relatively movable, condyle guides, an incisal guide, all of the guides being mounted on the maxillary frame, and elements on the mandibular frame engaged by the guides.

41. In an articulator as embodied in claim 40 wherein means is provided for adjusting one of the frames to open or close the bite and for preserving the resultant relation of the frames.

42. In an articulator, maxillary and mandibular frames relatively movable, condyle guides adjustable to occupy different positions in a horizontal plane, and means whereby the positions of the axis of rotation for lateral movements may be varied antero-posteriorly, said means comprising an element on one frame between the condyle guides and spaced members on the other frame between which the element extends.

43. In an articulator, maxillary and mandibular frames relatively movable, condyle guides mounted on the maxillary frame, and means whereby the positions of the axis of rotation for lateral movements may be varied antero-posteriorly, said means comprising an element on one frame between the condyle guides and spaced members on the other frame between which the element extends.

44. In an articulator, maxillary and mandibular frames relatively movable, right and left transversely disposed condyle rods on the mandibular frame coaxial with the opening axis of the frames and lying substantially in the inter-condylar axis, condyle guides on the maxillary frame engaging and guiding the condyle rods and laterally adjustable to occupy different positions along the condyle rods, and a pin and slot connection between the frames and situated between the condyle guides for controlling transverse movements of the frames.

Signed at Los Angeles in the county of Los Angeles, and State of California this 31st day of December, 1927.

JOHN A. LENTZ.